Feb. 1, 1966　　　　　G. KORTON　　　　　3,232,794
THERMOCOUPLE PROBE
Filed June 4, 1963
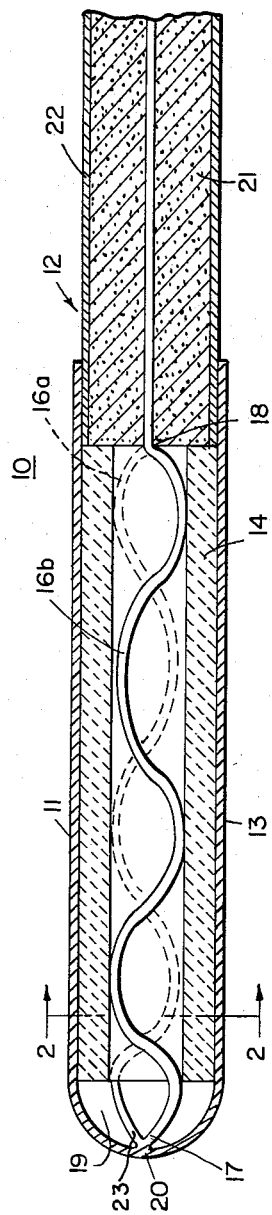
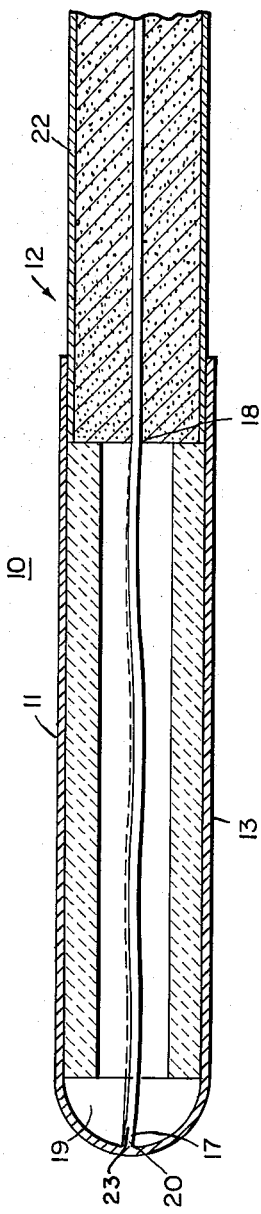
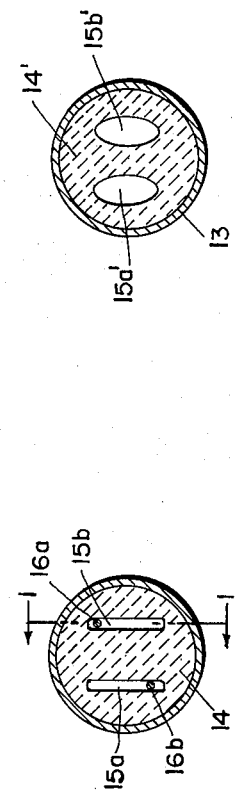
INVENTOR.
GEORGE KORTON
BY W. J. Shanley Jr.
HIS ATTORNEY

United States Patent Office 3,232,794
Patented Feb. 1, 1966

3,232,794
THERMOCOUPLE PROBE
George Korton, Cincinnati, Ohio, assignor to General Electric Company, a corporation of New York
Filed June 4, 1963, Ser. No. 285,391
11 Claims. (Cl. 136—4)

This invention relates to thermoelectric pyrometers and more particularly to high temperature thermocouples.

This invention is directed to the type of thermocouple commonly known as a grounded junction thermocouple. This type of thermocouple is characterized by the grounding of the junction directly to the inner surface of the sheath. However, in utilizing this configuration, failure of the thermocouple wires due to differential expansion is a major problem when the thermocouple wires, the insulator and the protective sheath have different coefficients of thermal expansion.

Previous attempts to solve this problem have been directed to using an ungrounded configuration in order to free the tip of the thermocouple from connection to the protective sheath. However, this construction reduces the accuracy of temperature measurements and the capability of the thermal element to respond to temperature changes.

Swaged construction techniques, utilizing powdered insulation, have also proved to be useful in temperature applications below 3000° F. since the tightly compacted insulation tends to prevent the entire stress, resulting from differential expansion, from being localized at the weakest point of the conductor. This is apparently due to the tendency of the compacted insulation to grip the conductor throughout its length. However, this technique is not normally possible above 3000° F. due to the magnitude of the differential expansion which takes place at these temperatures with commonly used materials. For example, when using a platinum 20% rhodium sheath with tungsten/tungsten 26% rhenium wires at temperatures above 3000° F., the wires have a tendency to break. Furthermore, it has been found that sheaths of platinum rhodium alloys start to melt at about this temperature. Therefore, it has been found necessary to go to other types of oxidation resistant materials to withstand these temperatures. One of the few materials known to satisfy this requirement is iridium which, however, is not ductile enough to permit a swaging operation. Furthermore, because of the high coefficient of thermal expansion of iridium, relative to the coefficient of the conductors normally used at these temperatures, the problem of overcoming differential expansion has been found not to lie in the direction of utilizing swaged construction techniques.

It is therefore an object of the invention to provide a new and improved thermocouple probe in which the problem of the failure of thermocouple wires, due to differential expansion, is eliminated.

It is another object of the invention to provide a new and improved grounded junction thermocouple probe which is not subject to failure of the thermocouple wires due to differential thermal expansion of the various elements of the thermocouple.

According to my invention, I provide, in a thermocouple of the type described, a ceramic or hard-fired insulator having formed therein two longitudinal passages or channels for receiving the thermocouple wires. In one form of my invention, the channels are so dimensioned relative to the dimensions of the thermocouple wires carried therein as to permit a substantially straight wire to bend within the channel when the wires are stressed due to the differential thermal expansion. In accordance with another form of the invention, provisions are made for such a channel so as to permit the insertion of preformed or bent wires, during the manufacture of the thermocouple. This permits the thermocouple wires to be subjected to stress without their rupturing.

The problem of the breakage of thermocouple wires has been a major problem since many of the metals utilized which are capable of operating in the 4000° F. range are also very brittle and therefore easily broken especially when cyclic forces are applied. For example, pure tungsten wire which is commonly used as one wire of the couple is very brittle, thus accentuating the aforementioned breakage problem. This problem is further accentuated when the grounded junction configuration is utilized, since the tungsten wire recrystallizes at the area affected by the heat applied during the "grounding" of the junction. This heat is necessary in order to fuse the sheath around the junction. The normally brittle wire becomes even weaker due to recrystallization, thus making the thermocouple very susceptible to breakage.

In accordance with one form of insulator useful in the embodiments of my invention, the channels may be formed so as to permit bending of the conductors in one plane, while limiting their movement in a direction normal to this plane. This tends to minimize the vibrational problems.

In accordance with another form of insulator useful in the embodiments of my invention, it has been found useful to so form the channels in the insulator so as to minimize the area of contact between the thermocouple wires and the walls of the channels. This may be provided by shaping the channels so as to have an oval or circular configuration thus eliminating the line of contact which would be found between the sides of generally rectangular channels and the conductors of the other form of insulator. This form of insulator has been found to be useful in increasing the insulation resistance between the sheath and conductors.

While the specification concludes with claims, particularly pointing out and distinctly claiming, the subject matter which I regard as my invention, it is believed that the invention will be better understood from the following description taken in connection with the accompanying drawing in which:

FIG. 1 is a longitudinal sectional view of one embodiment of the invention along the line 1—1 of FIG. 2;

FIG. 2 is a sectional view of the embodiment of FIG. 1 along the line 2—2;

FIG. 3 is a longitudinal sectional view of another embodiment of the invention; and FIG. 4 is a sectional view of another form of insulator which is useful in the embodiments of FIG. 1 and FIG. 3.

Referring now to FIG. 1, thermocouple probe 10 is disclosed as comprising an inflexible temperature-sensing portion 11 and a flexible connecting portion 12, portion 11 being comprised of a tubular metallic housing 13 which encompasses insulating means 14. In accordance with the preferred embodiments of the invention, which are operable up to 4300° F., housing 13 may be made of sintered iridium, while ceramic insulator 14 and powdered insulator 21 may be made of BeO. $ThO_2$, $Al_2O_3$, $M_gO$, $HfO_2$, $Z_rO_2$ and $Y_2O_3$ may also be used for insulator 14 and insulator 21.

Referring now to FIG. 2, generally elongated, rectangular channels 15a and 15b are provided for receiving conductors 16a and 16b, respectively, thus permitting their passage from flexible portion 12 to a grounded junction 23 at first point 17 on housing 13. These conductors, which are of dissimilar metals, may be selected from any of the well-known combinations of metals commonly utilized in the thermocouple art. For example, tungsten $v$ tungsten 26% rhenium (W $v$ W26Re) have been found to be useful in obtaining a thermocouple operable at 4300° F.

Flexible portion 12 of the thermocouple which is subjected to lesser temperatures than temperature-sensing portion 11 is flexible so as to permit it to be bent in shapes necessary for establishing an electrical connection to the temperature-sensing portion when it is in the environment to be observed. In accordance with the preferred embodiment of the invention portion 12 is formed by conventional swaging techniques now utilized, i.e., by compacting insulating material 21 under extremely high pressures. The material selected for the sheath 22 must not only be ductile, but it also should be resistant to oxidation or other undesirable chemical action with the gases to which it will be exposed. A suitable material for operating up to 3000° F. in an oxidizing atmosphere has been found to be platinum 20% rhodium (Pt20Rh) which is of suitable ductility.

Insulating material 21 should be compacted to a sufficient extent, during the swaging operation, so as to permit sheath 22 and the insulator 21 to be cut away to expose wires 16a and 16b without having the compacted powder exposed by the cut crumble off and enter channels 15a and 15b. Exposed conductors 16a and 16b may then be preformed by bending and then placed in their corresponding channel. Housing 13 and sheath 22 may then be brazed or otherwise joined together so as to seal the housing at this point. Thereafter the junction 23 is formed and grounded by melting end 20 around the junction formed by conductors 16a and 16b. In this manner conductors 16a and 16b are interconnected at two spaced apart points 17 and 18 with the conductors 16a and 16b effectively connected to the housing 13 at the second point 18.

As was previously indicated, if housing 13 has a greater coefficient of thermal expansion than conductors 16a and 16b, or if due to differential heating rates the housing expands more than the conductors, they should be preformed into a series of undulations or waves. The shape of the waves formed is not critical as long as the difference in thermal expansion between points 17 and 18 can be accommodated by having the effective length of these conductors correspondingly greater than the effective length of housing 13 between the same two points.

Space 19, as well as the space within channels 15a and 15b, may contain an inert gaseous atmosphere, such as helium, which protects the thermocouple wires from being exposed to gases which would adversely affect the life of these elements. This gaseous atmosphere is afforded by performing the welding operation which grounds the junction under a helium atmosphere.

Referring now to FIG. 3, where like elements bear the same reference numerals as corresponding elements in FIG. 1, conductors 16a and 16b should be substantially straight or otherwise shaped so that they can easily bend to take up the difference when housing 13 undergoes less thermal expansion than wires 16a and 16b. In this way, the wires can freely expand in the channels 15a and 15b by self-forming the conductors into waves or bends. In this description, it is assumed that insulator 14 has a coefficient of expansion equal to or less than that of the housing or sheath since, otherwise, it would tend to rupture the housing. Therefore, when speaking of "differential expansion" the coefficient of expansion of the sheath will be compared with that of the wires in arriving at the differential.

It has been found that when utilizing insulator 14, which has substantially rectangular channels 15a and 15b formed therein, the thermocouple is reasonably insensitive to vibrational forces since the outside diameter of wires 16a and 16b is slightly less than the width of the channels. For example, it has been found that when utilizing 10 mil thermocouple wires that channels 15a and 15b can be made 13 mils wide and approximately 36 mils long. Channels of these dimensions were utilized in an insulator having an outside diameter of 111 mils and the channels are separated by a distance of 37 mils.

Referring now to FIG. 4, there is disclosed an alternate embodiment of insulator 14, identified as insulator 14', which may be useful in the construction of FIG. 1 or 3 under conditions wherein the low value of insulation resistance between the conductors and the sheath is of concern due to high operating temperatures. In this configuration of the insulator, passages 15a' and 15b' may be formed in a generally oval configuration so as to limit the points of contact between it and conductors 16a and 16b. This tends to increase the insulating resistance afforded between conductors 16a and 16b and sheath 13. However, it is noted that this configuration of the insulator would normally not be expected to provide the same degree of vibration protection as is afforded by insulator 14.

It has been found that probes of the configuration of FIG. 1 have reliably operated without failure for long periods of time at 4300° F. during which time the thermocouple was subjected to severe thermal cycles. These probes were made of the following materials:

Insulators 14 and 21—BeO
Sheath 13—Ir
Sheath 22—Pt20Rh
Conductors 16a and 16b—W $v$ W26Re Thus, in accordance with the invention a new and improved thermocouple has been provided which will reliably and accurately operate at temperatures as high as 4300° F. for extended periods of time under severe conditions of thermal shock.

Therefore, while various embodiments of the subject invention have been shown and described herein, they are in the nature of description rather than limitation and it will occur to those skilled in the art that various changes, modifications, and combinations may be made within the province of the appended claims without departing either in spirit or scope from this invention in its broader aspects.

What I claim as new and desire to secure by Letters Patent of the United States is:

1. A device which is subjected to high temperatures comprising an exterior housing, a metallic conductor within said housing, said housing and said conductor being interconnected at two spaced apart points, said housing and said conductor having coefficients of thermal expansion and being subjected to heating rates such that differential expansion takes place between said points whereby transverse movement of said conductor is permitted to accommodate the differential thermal expansion and means comprising insulating means having a longitudinal channel therethrough which has an elongated cross section to receive said conductor and to support said conductor against transverse motion with respect to said channel, the dimension of said channel in the direction of elongation being substantially larger than the diameter of said conductor.

2. A thermocouple comprising an exterior housing, a pair of conductors of dissimilar metals within said housing, and insulating means having a pair of longitudinal channels with elongated cross sections for receiving said conductors and for supporting said conductors against transverse motion with respect to each of said channels, a cross-sectional dimension in the direction of elongation being substantially larger than the dimension of the corresponding one of said conductors in said direction of elongation to thereby permit transverse movement of said conductors when differential expansion takes place.

3. The combination of claim 2 in which said conductors terminate at one end thereof in a junction which is grounded to a first point on said housing, said conductors having another point along their length which is effectively connected to a second point on said housing.

4. The combination of claim 3 in which said housing is formed of a material having a thermal coefficient of expansion which is larger than the thermal coefficient of expansion of the metals forming said pair of conductors, said pair of conductors having one or more preformed bends therein in traversing said channel whereby said housing can expand a greater amount than said conductors without overstressing said conductors since the expansion of said housing merely tends to straighten out said conductors within their allowable stress limits.

5. The combination of claim 4 in which said conductors are circular in cross-section and each of said channel is shaped so that the dimension between opposed sides in a direction normal to said one direction is at least slightly greater than the diameter of the conductor contained therein, each of said conductors lying in a plane which is intermediate the opposed sides of the corresponding channel.

6. The combination of claim 5 in which said opposed sides are joined at each end by curved portions and said bends are formed so as to provide periodic contact between said conductors and said insulating means thus providing a pair of conductors which have effective lengths between said first and second points on said housing, which are substantially greater than the effective length of said housing between said points.

7. The combination of claim 6 in which said channels contain an inert atmosphere to prevent damage to said conductors at high temperatures.

8. The combination of claim 7 in which the dimension of each of said channels normal to said one direction is substantially greater than the diameters of the corresponding conductor thereby minimizing the contact area between said conductors and insulating means.

9. A thermocouple comprising an exterior housing, a pair of conductors of dissimilar metals, said conductors terminating at one end thereof in a junction which is grounded to a first point on said housing, said conductors having another point along their length which bears a fixed position with respect to a second point on said housing, and insulating means having a pair of longitudinal channels therethrough having elongated cross sections for receiving said conductors and supporting said conductors against transverse motion with respect to said channels, each of said channels having a cross-sectional dimension in the direction of elongation which is substantially larger than the dimension of the corresponding one of said conductors in said direction of elongation, said housing being formed of a material having a thermal coefficient of expansion which is smaller than the thermal coefficient of expansion of the metals forming said conductors, said pair of conductors each having effective lengths between said first and second points which are substantially equal to the effective length of said housing between said points.

10. The combination of claim 9 in which said conductors are circular in cross-section and each of said channels is shaped so that the dimension in a direction normal to said one direction is at least slightly greater than the diameter of the conductor contained therein.

11. The combination of claim 10 in which the dimensions of each of said channels normal to said one direction is substantially greater than the diameter of the corresponding conductor thereby minimizing the contact area between said conductors and insulating means.

References Cited by the Examiner

UNITED STATES PATENTS

| | | | |
|---|---|---|---|
| 2,787,784 | 4/1957 | Meryman et al. | 340—227 |
| 2,988,717 | 6/1961 | Bergsma | 73—362 X |
| 3,027,532 | 3/1962 | Du Bois | 338—316 X |
| 3,080,755 | 3/1963 | Percy | 73—355 |

FOREIGN PATENTS

| | | |
|---|---|---|
| 707,557 | 6/1941 | Germany. |
| 627,610 | 8/1949 | Great Britain. |
| 925,604 | 2/1962 | Great Britain. |

DAVID SCHONBERG, *Acting Primary Examiner.*

LOUIS R. PRINCE, *Examiner.*

D. M. YASICH, *Assistant Examiner.*